(12) United States Patent
Haller

(10) Patent No.: US 6,401,637 B1
(45) Date of Patent: Jun. 11, 2002

(54) MICROWAVE ENERGY APPLICATOR

(76) Inventor: Harold Earl Haller, 10935 Martinsville Rd., Boonville, MO (US) 65233

( * ) Notice: Subject to any disclaimer, the term of this patent is extended or adjusted under 35 U.S.C. 154(b) by 0 days.

(21) Appl. No.: 09/882,909

(22) Filed: Jun. 15, 2001

Related U.S. Application Data
(60) Provisional application No. 60/225,421, filed on Jan. 8, 2001.

(51) Int. Cl.$^7$ .............................................. A01C 15/00
(52) U.S. Cl. ...................................................... 111/118
(58) Field of Search ................... 111/118, 200, 111/915; 47/1.3, 1.5, 1.7; 905/131

(56) References Cited

U.S. PATENT DOCUMENTS

| | | |
|---|---|---|
| 3,263,052 A | 7/1966 | Jeppson et al. |
| 4,196,785 A * | 4/1980 | Downing, Jr. ............. 180/6.28 |
| 4,252,459 A | 2/1981 | Jeppson |
| 4,252,487 A | 2/1981 | Jeppson |
| 4,319,856 A | 3/1982 | Jeppson |
| RE31,023 E * | 9/1982 | Hall, III ....................... 47/1.3 |
| 4,347,907 A * | 9/1982 | Downing, Jr. ............. 180/6.28 |
| 6,237,278 B1 * | 5/2001 | Persson et al. ............... 47/1.3 |

* cited by examiner

Primary Examiner—Robert E. Pezzuto
(74) Attorney, Agent, or Firm—Husch & Eppenberger, LLC; Robert E. Muir; Richard J. Musgrave

(57) ABSTRACT

An apparatus and method is provided for rapidly treating the surface and subsurface of soil by irradiation with microwave energy to preclude germination of existing seeds and to kill weeds prior to sowing new seed and to kill insects. A microwave weed seed sterilizer is powered by a generator set to produce microwave energy to a predetermined depth in the soil. The preferred embodiment of the microwave weed seed sterilizer is portable and operatively attached to a self-propelled farm machine. The self-propelled farm machine moves along a field while the portable microwave weed seed sterilizer emits microwave energy into the soil.

22 Claims, 4 Drawing Sheets

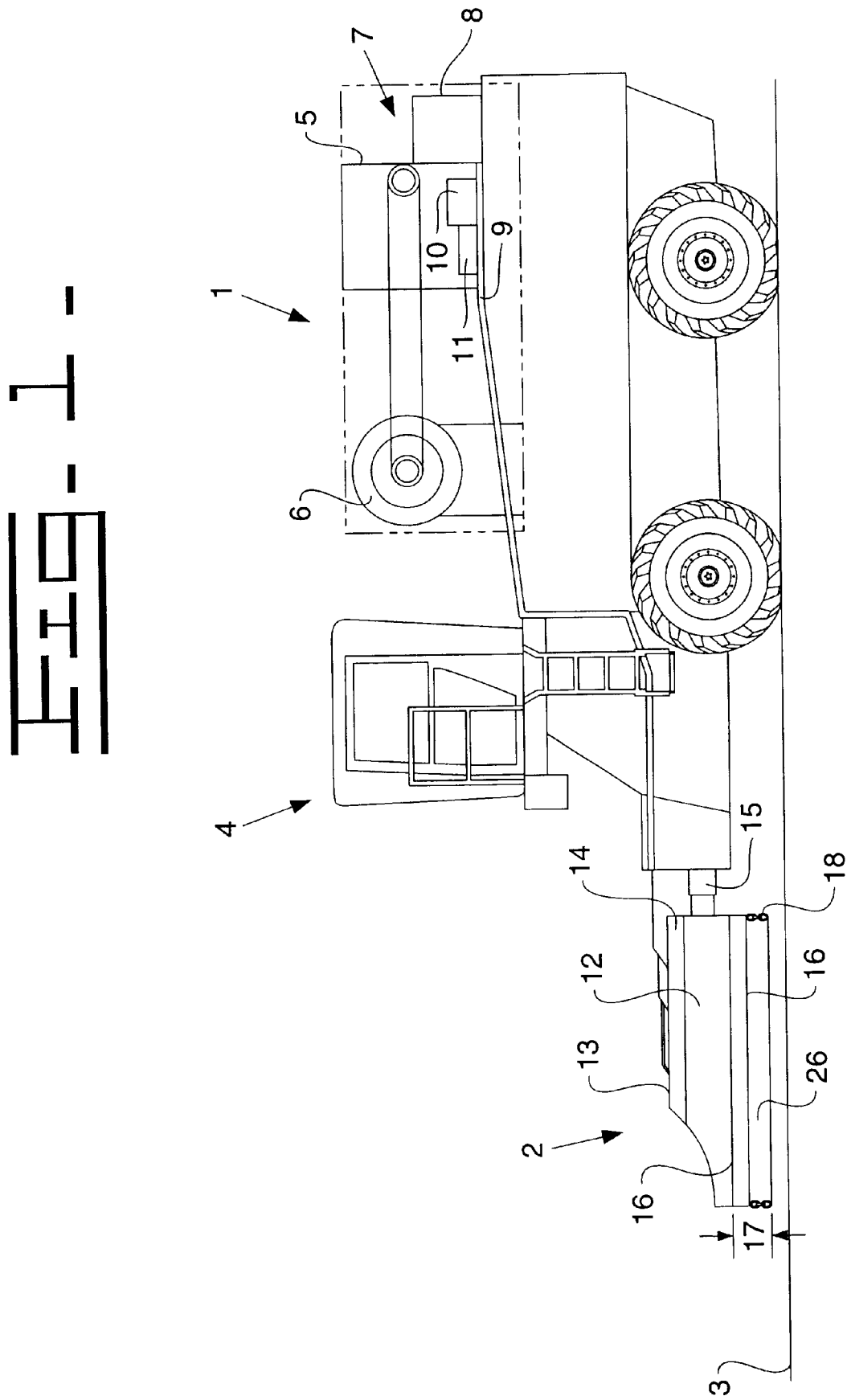

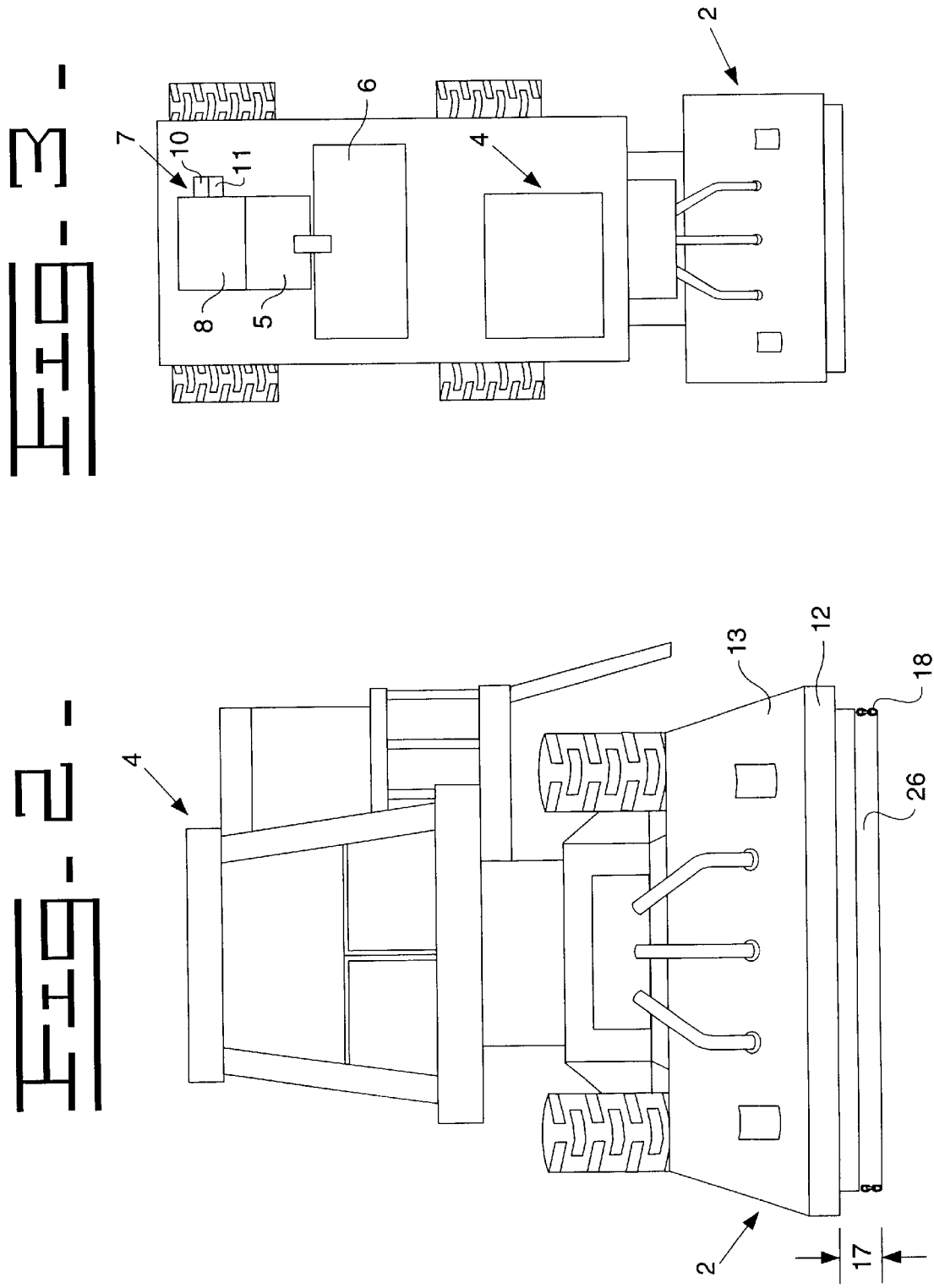

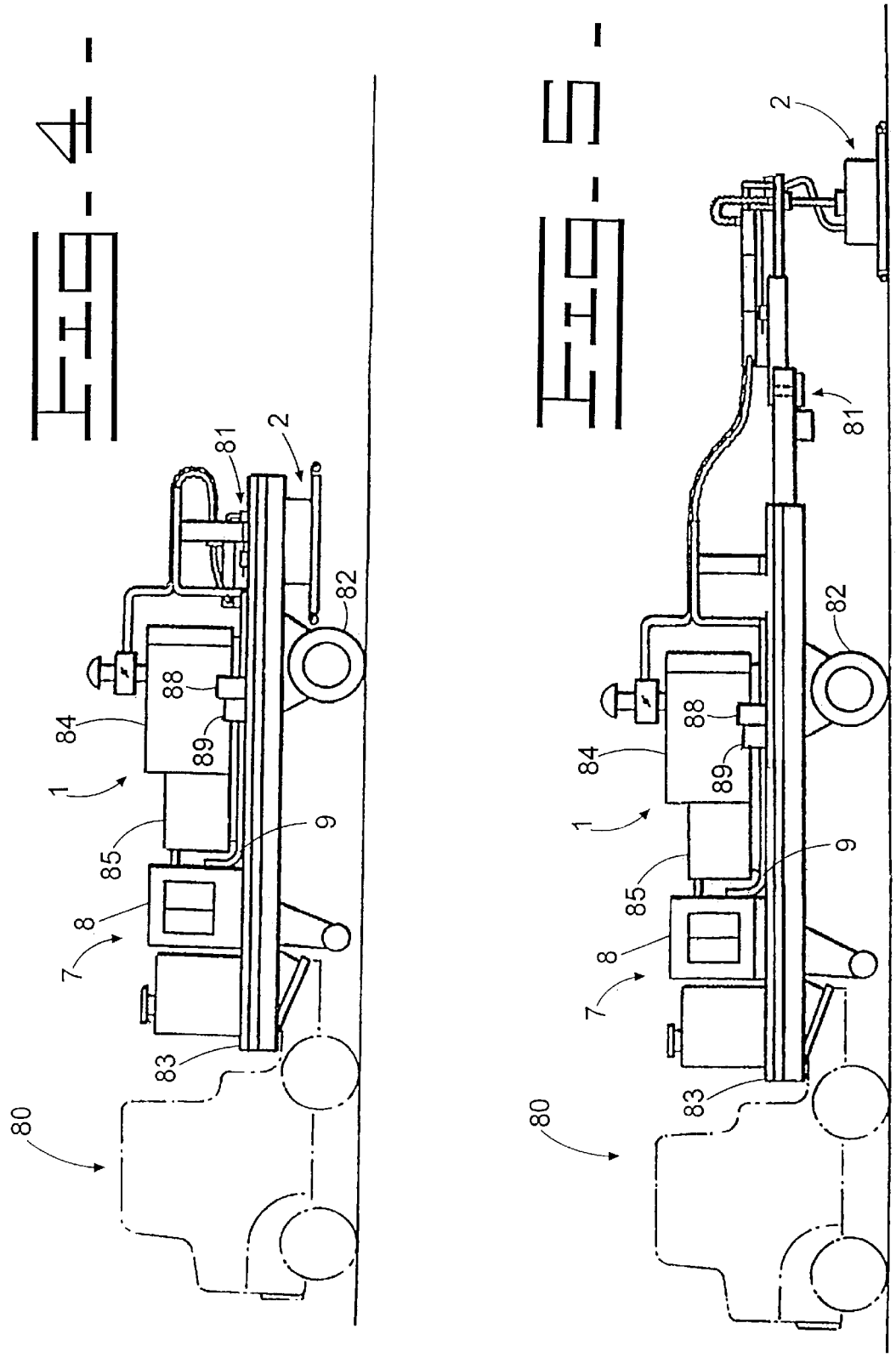

MICROWAVE ENERGY APPLICATOR

This application is a continuation in part of provisional application Ser. No. 60/225,421, filed Jan. 8, 2001.

FIELD OF THE INVENTION

This invention relates to planting and more specifically to an apparatus and method for treating the soil prior to planting seed.

DESCRIPTION OF THE RELATED ART

Agricultural crop production requires preparing a bed of soil prior to planting. The task of properly preparing the soil for planting includes treating the soil to preclude germination of existing seed, to kill weeds prior to sowing seed and to kill insects. Many farmers add pesticides, herbicides and/or insecticide to treat the soil prior to sowing seed. These chemical additives are applied to provide the best possible growth medium for the crop. Farm machine is used to apply these chemical additives. For example, tractor pulled harrows and spray rigs, as separate implements, typically provide these soil preparation functions.

The available acreage of arable land is declining worldwide. Conversion of farmland to non-farming uses is a primary reason for this decline. Furthermore, arable soil that was once in prime condition is degrading over the years as farm chemicals, wind erosion, salt formation and nutrient depletion from over-farming, take their respective tolls. Additionally, the lack of economical, dependable and clean water casts another cloud on the farm operation because of the use of chemicals. Dwindling ground water resources, water allocation rights disputes, and water pollution results in an inability to farm on land that would otherwise be productive but for the lack or uncertainty of water availability from planting through harvest. Government regulations, in an attempt to correct current problems, often only further hobble the farmer. Land use and growth management laws effectively lock up potential farm lands. Additionally, agricultural pesticides, herbicides and insecticides are under increasing scrutiny, resulting in frequent bans and restrictions on their application. These limitations result in a steady reduction in the farmer's ability to economically preclude germination of existing seed, to kill weeds prior to sowing seed and kill insects. Additionally, the disfavor of farm chemicals by the government and the public has induced a resurgence of interest in organic farming methods. Methods that employ non-chemical means to achieve soil preparation are urgently needed to makeup for the loss of chemicals once depended upon as mainstays of the modern farm.

When herbicides became readily available in the 1960's, many farmers began to use a "no-till" method for growing crops. In the no-till system, wastes from the preceding crop are left on the field as a covering called mulch. Farmers spray the mulch with a herbicide and apply fertilizer. Rain water washes the chemicals down through the mulch and into the soil. Often, no further soil preparation is necessary and the seed bed is ready for planting. However, the no-till method also has certain disadvantages. Some of the existing seed is not treated, hence, the existing seed germinates. This is not desirable because the existing seed is an offspring of the prior years seed, which yields an inferior crop. Further, some weeds are not treated and killed by the chemicals, hence, weed control becomes a problem. In addition, the heavy use of herbicides may cause environmental problems. In most locations environmental regulations severely limit the use of herbicides.

Today, many farmers still use the no-till method. As an attempt to reap many of the benefits of the no-till system, while additionally achieving the soil treatment offered by tilling, farmers are adopting reduced tillage or conservation tillage methods. In these methods, deep plowing is replaced by a less invasive implement, such as a harrow. Plant wastes are also left on the surface as mulch, to help control erosion and hold in moisture. However, under both the till and no-till systems, the chemicals are problematic. The pressures of water conservation, and farm chemical regulations force more farmers to adopt new methods to treat the soil.

The protection of crops from weeds and other vegetation, which inhibit crop growth, is a constantly recurring problem in agriculture. To help combat this problem researchers in the field of synthetic chemistry have produced an extensive variety of chemicals and chemical formulations effective in the control of such unwanted growth. Chemical herbicides are well-known and a large number are in commercial use. Unfortunately, many of such herbicides will exhibit phototoxicity to the desired crop as well as to the weeds sought to be controlled. Thus, there is a long-standing need for soil preparation, which will not adversely affect the crop and environment.

The present invention is directed to overcoming one or more of the problems set forth above.

SUMMARY OF THE INVENTION

An aspect of the invention is to provide an apparatus for treating the soil prior to planting seed to preclude germination of existing seed and to kill weeds prior to sowing seed.

In another aspect of the invention there is provided a method for treating the soil prior to planting seed to preclude germination of existing seed, kill weeds prior to sowing seed and kill insects.

In another aspect of the invention there is provided an apparatus and method for treating the soil prior to planting seed to preclude germination of existing seed, kill weeds prior to sowing seed and kill insects without chemicals.

Yet another aspect of the invention there is provided an apparatus for treating soil prior to planting by microwave to preclude germination of existing seed, kill weeds prior to sowing seed and kill insects.

Still another aspect of the invention there is provided a method for treating soil prior to planting by microwave to preclude germination of existing seed, kill weeds prior to sowing seed and kill insects.

Yet in another aspect of the invention, soil is treated by directing microwave energy downward into the soil to generate microwave energy within the soil, including within the subsurface region thereof.

In another aspect of the invention there is provided an apparatus for treating soil by a portable microwave weed seed sterilizer or energy applicator which may be positioned over a selected area of the soil to be treated in order to generate microwave energy onto and into the soil by microwave irradiation.

In still another aspect of the invention, soil preparation to preclude germination of existing seed, kill weeds prior to sowing seed and to kill insects is much more environmental friendly because the application of chemicals is reduced or eliminated.

It is another aspect of the invention to provide a self-propelled farm machine for moving an apparatus for treating soil by a portable microwave weed seed sterilizer or energy applicator along a field such that the area below the portable microwave weed seed sterilizer is positioned over the soil to be treated in order to generate microwave energy onto and into the soil by microwave irradiation.

The above aspects are merely illustrative and should not be construed as all-inclusive. The aspects should not be construed as limiting the scope of the invention rather the scope of the invention is detailed in the appended claims.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 is a side view of a self-propelled farm machine having a portable microwave weed seed sterilizer attached thereto.

FIG. 2 is a front view of the farm machine having a portable microwave weed seed sterilizer attached thereto according to FIG. 1.

FIG. 3 is a top view of the farm machine having a portable microwave weed seed sterilizer attached thereto according to FIG. 2.

FIG. 4 is a side elevation view of a portable microwave weed seed sterilizer attached to a self-propelled travelling system, wherein the portable microwave weed seed sterilizer is in the retracted position to facilitate movement of the self-propelled travelling system.

FIG. 6 is an elevation section view of an alternative embodiment of a portable microwave weed seed sterilizer or energy applicator for heating soil, which is a component of the apparatus of FIGS. 4 and 5.

DETAILED DESCRIPTION

Figure 5:
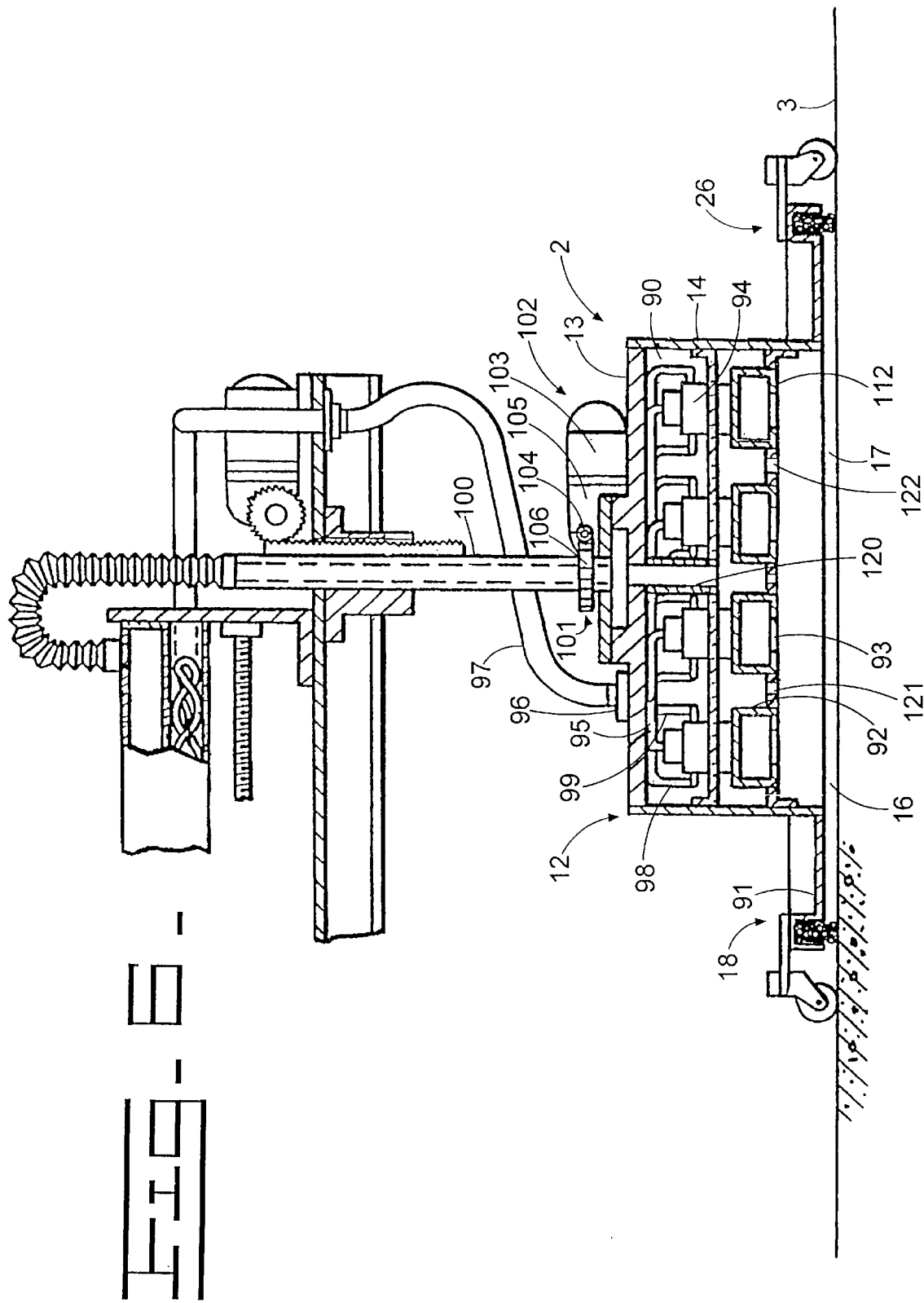
FIG. 5 is a side elevation view of a portable microwave weed seed sterilizer attached to a self-propelled travelling system, wherein the portable microwave weed seed sterilizer is shown in the operating position.

FIG. 1 illustrates a self-propelled farm machine 4, having a frame (not shown), which may be the frame of a combine harvester. The self-propelled farm machine 4 is powered by an engine (not shown). The self-propelled farm machine 4 has a generator set 1 mounted thereon. The generator set 1 is operatively connected to a portable microwave weed seed sterilizer or energy applicator 2, hereinafter described in more detail, which in operation is positioned over a predetermined area of soil 3 to be treated. While the portable microwave weed seed sterilizer or energy applicator 2 may be a separate unit which can be positioned and moved to successive areas of the soil 3 to be treated, in the preferred embodiment it is attached to the self-propelled farm machine 4. This enables the portable microwave weed seed sterilizer or energy applicator 2 to be moved over the soil 3 and enables positioning the portable microwave weed seed sterilizer or energy applicator 2 at different heights.

The generator set 1 includes a second engine 5, conveniently a diesel engine, for driving a generator 6. In one embodiment, the generator 6 is a 150 kilowatt generator. In alternative embodiments, the portable microwave weed seed sterilizer or energy applicator 2 may require more electrical power so the generator set 1 may need to be in a different wattage to accommodate same. The generator 6 supplies electrical energy to a microwave source power supply 7, which may be of known construction, and which is situated in a cabinet 8. An insulated output cable 9 from the microwave source power supplies 7 extends to and connects with the portable microwave weed seed sterilizer or energy applicator 2 in a manner hereinafter described.

One or more tanks or receptacles (not shown) for carrying supplies of farming or other materials may be carried on the self-propelled farm machine 4. A pump 10 for supplying coolant to the microwave source power supply 7 and driven by an electrical motor 11 is operatively mounted to the self-propelled farm machine 4.

The portable microwave weed seed sterilizer or energy applicator 2 is of rectangular configuration in this example and has an inverted box-like housing 12 with a top member 13 and downwardly extending side wall members 14, all of which are formed of electrically conductive material to block the escape of microwave energy from the containment region (not shown) in upward and outward directions. To facilitate positioning and movement of the portable microwave weed seed sterilizer or energy applicator 2, a hydraulically-operated coupling 15 extends from the front of the self-propelled farm machine 4 for mounting the portable microwave weed seed sterilizer or energy applicator 2. The hydraulically-operated coupling 15 allows an operator to locate the portable microwave weed seed sterilizer or energy applicator 2 with respect to the soil 3 from inside the self-propelled farm machine 4. The hydraulically-operated coupling 15 by which the portable microwave weed seed sterilizer or energy applicator 2 is mounted on the self-propelled farm machine 4 enables the portable microwave weed seed sterilizer or energy applicator 2 to be lifted to a nonoperative or "up" position when not in use and/or traveling to different work sites. The portable microwave weed seed sterilizer or energy applicator 2 is shown in the non-operational position; however, in the operational position, a gap 17, preferably small, between the soil 3 and bottom edges 16 of the portable microwave weed seed sterilizer or energy applicator 2 will be present. To suppress outward propagation of microwave energy through the gap 17, trapping means 26 are provided between the bottom edges 16 and soil 3. The trapping means 26 in this example are horizontal panels of electrically conductive material, which have a slightly spaced relationship from the soil 3, to form what is termed a "gap trap". The electrically conductive panels function to suppress broadcasting of microwave energy outwardly through the gap 17 because it is a characteristic of microwave energy that in propagating through space, the energy does not flow in a coherent manner, but instead continually tends to disperse relative to the nominal direction of propagation. Consequently, as energy propagates outwardly within the gap 17 between the trapping means 26 and soil 3, a portion of such energy travels downwardly into the soil 3 where it is absorbed. Another portion of such energy, which would otherwise propagate upwardly, is reflected by the conductive panels of the trapping means 26 and redirected downwardly into the soil 3 where it is also absorbed. Consequently, there is a progressive attenuation of microwave energy intensity in the outward direction along the gap 17 between the trapping means 26 and the soil 3. By forming the conductive panels of the trapping means 26 to be of sufficient lateral extent, typically at least several centimeters, the intensity of microwave energy at the outer edges of the conductive panels may be reduced to a negligible value.

Suppression of the release of microwave energy, other than downwardly into the absorbent soil 3, is further assured by supplementing the gap trap defined by the conductive panels of the trapping means 26 with another and different form of microwave energy trap which may be of a type termed "chain traps" 18. The chain traps 18 are conductive material extending fully around the trapping means 26. The chain traps 18 are short portions of flexible metallic chain, which are of sufficient length to extend downward from the trapping means 26 to contact and drag along the surface of the soil 3. The chain traps 18 function to block the outward propagation of microwave energy through the gap 17 because such energy cannot pass through a mass of electrically conductive material in which all interstices or open passages have transverse dimensions substantially smaller than the wavelength of the microwave energy. There are many other types of microwave traps known in the art, which could be substituted for the traps discussed herein.

To provide for the downward release of microwave energy into the soil 3 underlying the portable microwave weed seed sterilizer or energy applicator 2, a horizontal panel (not shown) is secured within the portable microwave weed seed sterilizer or energy applicator 2 to support one or more waveguides (not shown) of the leaky waveguide form disclosed in U.S. Pat. No. 3,263,052 and thus each such waveguide has a series of microwave emission slits (not shown) spaced apart along the underside of the waveguide to provide for a distributed downward release of microwave energy into the area of the soil 3 over which the portable microwave weed seed sterilizer or energy applicator 2 is disposed.

The waveguides are excited by a suitable microwave source means which in this example includes two 75 kilowatt magnetron tubes situated at one end of each waveguide and supported thereon within the portable microwave weed seed sterilizer or energy applicator 2. Electrical connections (not shown) are provided between the magnetron tubes (not shown) in the portable microwave weed seed sterilizer or energy applicator 2 and the microwave source power supply 7. Liquid coolant supply and return conduits (not shown) connect the pump 10 with the magnetron tubes. The operation of microwave devices and the use of coolant to cool the magnetron tubes are known to those skilled in the art and no further explanation is needed.

Separate engines for driving the self-propelled farm machine 4 and the generator 6 are described above. It is contemplated that one engine could be used to power both the self-propelled farm machine 4 and the generator 5.

Referring now to FIGS. 4 and 5 in combination, a self-propelled travelling system 80 is substituted for the self-propelled farm machine 4. It is important to note that the previously described elements are incorporated into the self-propelled travelling system 80. The differences being the substitution of the self-propelled farm machine 4 and the differences hereinafter described. The self-propelled travelling system 80 has the portable microwave weed seed sterilizer or energy applicator 2 previously described is operatively attached thereto. FIG. 4 illustrates the portable microwave weed seed sterilizer or energy applicator 2 attached to the self-propelled travelling system 80, wherein the portable microwave weed seed sterilizer or energy applicator 2 is in a retracted position to facilitate movement of the self-propelled travelling system 80. FIG. 5 illustrates the portable microwave weed seed sterilizer or energy applicator 2 attached to the self-propelled travelling system 80, wherein the portable microwave weed seed sterilizer or energy applicator 2 is shown in an operating position. The portable microwave weed seed sterilizer or energy applicator 2 is positioned over the predetermined area of the soil 3 to heated in the operating position. In the preferred embodiment, the portable microwave weed seed sterilizer or energy applicator 2 is attached to a portable device, such as the self-propelled travelling system 80 by support linkage 81 which enables a limited degree of repositioning of the portable microwave weed seed sterilizer or energy applicator 2 at different closely located areas of the soil 3 without necessarily requiring movement of the self-propelled travelling system 80. However, in alternative embodiments, the portable microwave weed seed sterilizer or energy applicator 2 is adapted to be manually positioned and manually moved to successive areas of the soil 3 to be heated.

In addition to the portable microwave weed seed sterilizer or energy applicator 2 and the support linkage 81, the self-propelled travelling system 80 carries the generator set 1, and more specifically a motor generator set, of the known form having a fuel consuming motor 84 driving an electrical generator 85. The fuel consuming motor 84 may, for example, be of the diesel variety although other types of fuel burning engine may also be employed. Additional motor-generator sets may also be provided where the portable microwave weed seed sterilizer or energy applicator 2 requires more electrical power than is provided by a single set. The electrical generator 85 supplies electrical energy to the microwave source power supply 7, which may be of known construction, and which are situated in the cabinet 8 on the platform 83. The insulated output cable 9 from the microwave power supply 7 extends backward along the platform 83 to operatively connect with the portable microwave weed seed sterilizer or energy applicator 2. A pump 88 for supplying coolant to the microwave sources together with an electrical drive motor 89 are also situated on the platform 83.

In another alternative embodiment, the generator set 1, the fuel consuming motor 84, the electrical generator 85, the microwave source power supply 7, the cabinet 8, the pump 88, the electrical drive motor 89 and other associated parts are placed on a towable trailer (not shown). In this example, the self-propelled travelling system 80 has the towable trailer of the form having the bed or platform 83 riding on rear road wheels 82.

Referring now to FIG. 6, the portable microwave weed seed sterilizer or energy applicator 2 is of rectangular configuration in this example and has the inverted box-like housing 12 with the top member 13 and the downwardly extending side wall members 14, all of which are formed of electrically conductive material to block the escape of microwave energy from a containment region 90 in upward and outward directions. The gap 17 is located between the soil 3 and the bottom edges 16 of the side wall members 14. To suppress outward propagation of microwave energy through the gap 17, the trapping means 26 are provided at an outer side of the bottom edges 16 of the side wall members 14 of the inverted box-like housing 12. The trapping means 26, in this example, include horizontal panels 91 of electrically conductive material, which extend outward from the bottom edges 16 of the side wall members 14 of the inverted box-like housing 12 in a slightly spaced-apart relationship from the soil 3, to form what is termed a "gap trap". The electrically conductive panels function to suppress broadcasting of microwave energy outwardly through the gap 17 since it is a characteristic of microwave energy that in propagating through space, the microwave energy does not flow in a coherent manner, but instead continually tends to disperse relative to the nominal direction of propagation. Consequently, as the microwave energy propagates outwardly within the gap 17 between the trapping means 26 and the soil 3, a portion of the microwave energy travels downwardly into the soil 3 where it is absorbed. Another portion of such energy, which would otherwise propagate upwardly, is reflected by the conductive panels and redirected downwardly into the soil 3 where it is also absorbed. Consequently, there is a progressive attenuation of microwave energy intensity in the outward direction along the gap 17 between the trapping means 26 and the soil 3. By forming the conductive panels of the trapping means 26, typically at least several centimeters, the intensity of microwave energy at the outer edges of the panels may be reduced to a negligible value.

Suppression of the release of microwave energy, other than downwardly into the absorbent soil 3, is further assured by supplementing the gap trap defined by the conductive panels with another and different form of microwave energy trap which in this example is of a type termed "chain traps" 18. The chain traps 18 are of conductive material extending fully around the trapping means 26. The chain traps 18 are short portions of flexible metallic chain, which are of sufficient length to extend downward from the trapping means 26 to contact and drag along the surface of the soil 3. The chain traps 18 function to block the outward propagation of microwave energy through gap 17 because such energy cannot pass through a mass of electrically conductive material in which all interstices or open passages have transverse dimensions substantially smaller than the wavelength of the microwave energy.

To provide for the downward release of microwave energy into the soil 3 underlying the portable microwave weed seed sterilizer or energy applicator 2, a horizontal panel 112 is secured within the portable microwave weed seed sterilizer or energy applicator 2 to support at least one waveguides 92 of the leaky waveguide form disclosed in U.S. Pat. No. 3,263,052 and thus each at least one waveguide 92 has a series of microwave emission slits 93 spaced apart along the underside of the at least one waveguide 92 to provide for a distributed downward release of microwave energy into the area of the soil 3 over which the portable microwave weed seed sterilizer or energy applicator 2 is disposed.

The at least one waveguide 92 is excited by suitable microwave source means which, in this example, include at least one separate magnetron tube 94 situated at one end of each of the at least one waveguide 92 and supported thereon within the inverted box-like housing 12. Electrical connections between each of the at least one magnetron tube 94 and the previously described microwave source power supply 7 are provided for by electrical conductors 95 which extend from each of the at least one magnetron tube 94 to a connector 96 on the top member 13 to which a flexible multi-conductor cable 97 is connected. Liquid coolant supply conduits 98 from the pump 88 of FIGS. 4 and 5 and coolant return conduits 99 for the at least one magnetron tube 94 also extend from each of the at least one magnetron tube 94 into the flexible multi-conductor cable 97 through the connector 96.

FIG. 6 illustrates a vertical support shaft 100 extending upward from the center of the top member 13 and coupled to the inverted box-like housing 12 through a swivel joint 101 thereby enabling the inverted box-like housing 12 to be rotated relative to the vertical support shaft 100 for purposes to be hereinafter described. While such rotation of the portable microwave weed seed sterilizer or energy applicator 2 may be accomplished manually, it is advantageous to provide powered positioning means 102 which, in this example, includes a reversible electrical motor 103 secured to the top member 13 for driving a worm gear 104 through a speed reducing gear box 105. The worm gear 104 engages a gear 106 secured to the vertical support shaft 100 in coaxial relationship thereon so that by operation of the reversible electrical motor 103, the portable microwave weed seed sterilizer or energy applicator 2 may be swiveled in either direction relative to the vertical support shaft 100.

INDUSTRIAL APPLICABILITY

The portable microwave weed seed sterilizer or energy applicator 2 and the operatively connected generator set 1 are used to microwave plowed fields to kill or preclude the germination of existing seed, kill weeds prior to planting new seed and kill insects. The microwaves emitted from the portable microwave weed seed sterilizer or energy applicator 2 contact the surface and subsurface of the soil 3. Preferably microwaves are emitted approximately 2 inches (5.08 centimeters) below the surface of the soil 3.

In the preferred embodiment, the portable microwave weed seed sterilizer or energy applicator 2, the generator set 1 and the other segments described previously are operatively mounted on the self-propelled farm machine 4. The portable microwave weed seed sterilizer or energy applicator 2 can be located in virtually any position with relation to the self-propelled farm machine 4 including underneath the self-propelled farm machine 4. The self-propelled farm machine 4 is moved to a location to be treated, such as an arable field. The portable microwave weed seed sterilizer or energy applicator 2 is lowered to an area above the soil 3, which is to be treated, by operation of the hydraulically-operated coupling 15. The generator set 1 is operated to supply energy to the magnetron tubes via the microwave source supply 7. Microwave energy is directed downwardly into the underlying area of the soil 3. The self-propelled farm machine 4 moves over the field while the portable microwave weed seed sterilizer or energy applicator 2 emits rapid and relatively uniform in-depth treating of the upper 2 inches of the soil 3. The microwave energy treats seeds existing in the upper 2 inches of the soil 3 and prevents germination. Moreover, the microwave energy kills weeds and insects. When the field has been treated, the portable microwave weed seed sterilizer or energy applicator 2 is raised by the hydraulically-operated coupling 15 to an "up" position for transportation elsewhere. It is believed that seeds more than 2 inches below the surface will not ordinarily germinate; hence treatment need not go to lower depths.

Process conditions, such as microwave power levels, may vary considerably depending on the soil 3 types to be treated. While a wide range of microwave frequencies will generate microwave energy in the soil 3, the actual frequency to be employed is usually determined by governmental regulations, which assign certain specific frequencies to certain specific types of usage. In the United States of America at this time, the two frequencies of 915 MHz and 2450 MHz are the assigned frequencies for industrial applications of microwave energy, but other frequencies may be used where permitted by local regulations. The intensity of the microwave irradiation of the soil 3 in terms of power per unit area determines treating time but is subject to practical limits. Higher intensities require more costly microwave generation equipment and larger electrical generation facilities to energize the microwave sources.

While preferred embodiments have been illustrated and described, this has been by way of illustration and the invention should not be limited except as required by the scope of the appended claims. Other aspects, objects and advantages of this invention can be obtained from a study of the drawings, the disclosure and the appended claims.

What I claim is:

1. An apparatus for rapidly treating a soil's surface and subsurface by irradiation with microwave energy, comprising:
- a microwave energy applicator for emitting microwave energy into the surface and the subsurface of the soil;
- a frame;
- means for mounting the microwave energy applicator on the frame and for movement between a first position adjacent the soil's surface and a second position removed therefrom;
- a generator set operatively connected and for providing power to the microwave energy applicator when it is in the first position to sterilize seeds and kill insects in the soil; and
- means for moving the microwave energy applicator over the surface of the soil to be irradiated.

2. The apparatus for rapidly treating a soil's surface and subsurface by irradiation with microwave energy according to claim 1, wherein the generator set includes a generator.

3. The apparatus for rapidly treating a soil's surface and subsurface by irradiation with microwave energy according to claim 2, further includes:
- a second engine for driving the generator and operatively connected thereto;
- a microwave source power supply for receiving electrical energy from the generator; and
- an insulated output cable operatively connected to the microwave source power supply, and wherein the insulated output cable provides power to the microwave energy applicator.

4. The apparatus for rapidly treating a soil's surface and subsurface by irradiation with microwave energy according to claim 1, wherein the microwave energy applicator includes an inverted box-like housing having a top and downwardly extending side wall members located transverse to the top member and extend downward therefrom, wherein the inverted box-like housing, the top member and the downwardly extending side wall members, having bottom edges, are formed of electrically conductive material to block the escape of microwave energy from the inverted box-like housing of the microwave energy applicator.

5. The apparatus for rapidly treating a soil's surface and subsurface of soil by irradiation with microwave energy according to claim 4, further includes:
- a trapping means formed from electrically conductive material attached to the bottom edges and located between the bottom edges and the surface of the soil terminating prior to the surface of the soil, wherein there is a gap between the surface of the soil and the trapping means, wherein the electrically conductive material suppresses broadcasting of the microwave energy through the gap.

6. The apparatus for rapidly treating a soil's surface and subsurface by irradiation with microwave energy according to claim 4, further includes:
- chain traps are flexible metallic chains made from conductive material extending around the trapping means, wherein the chain traps extend downwardly from the trapping means contacting and dragging along the surface of the soil and the chain traps assist in blocking the outwardly propagation of microwave energy through the gap.

7. The apparatus for rapidly treating a soil's surface and subsurface by irradiation with microwave energy according to claim 3, further includes:
- at least one waveguide operatively mounted in the microwave energy applicator, having slits spaced apart along an underside to provide for a distributed downward release of microwave energy into the soil's surface and subsurface;
- a horizontal panel operatively mounted within the microwave energy applicator to support the at least one waveguide; and
- at least one magnetron tube operatively connected to the at least one waveguide, wherein the waveguides are excited by the at least one magnetron tube.

8. The apparatus for rapidly treating a soil's surface and subsurface by irradiation with microwave energy according to claim 7, further includes:
- electrical connections located between the magnetron tubes in the microwave energy applicator and the microwave source power supply.

9. A self-propelled farm machine comprising:
- a frame;
- an apparatus for rapidly treating a soil's surface and subsurface by irradiation with microwave energy, the apparatus comprising:
  - a microwave energy applicator for emitting microwave energy into the surface and the subsurface of the soil;
  - means for mounting the microwave energy applicator on the frame and for movement between a first position adjacent the soil's surface and a second position removed therefrom;
  - a generator set mounted on the frame and operatively connected to and for providing power to the microwave energy applicator when it is in the first position to sterilize seeds and kill insects in the soil; and
  - means for moving the microwave energy applicator over the surface of the soil to be irradiated.

10. The self-propelled farm machine having an apparatus for rapidly treating a soil's surface and subsurface by irradiation with microwave energy according to claim 9, wherein the generator set includes a generator.

11. The self-propelled farm machine having an apparatus for rapidly treating a soil's surface and subsurface by irradiation with microwave energy according to claim 10, further includes:
- a second engine for driving the generator and operatively connected thereto;
- a microwave source power supply for receiving electrical energy from the generator; and
- an insulated output cable operatively connected to the microwave source power supply, and wherein the insulated output cable provides power to the microwave energy applicator.

12. The self-propelled farm machine having an apparatus for rapidly treating a soil's surface and subsurface by irradiation with microwave energy according to claim 9, wherein the microwave energy applicator includes an inverted box-like housing having a top and downwardly extending side wall members located transverse to the top member and extend downward therefrom, wherein the inverted box-like housing, the top member and the downwardly extending side wall members, having bottom edges, are formed of electrically conductive material to block the escape of microwave energy from the inverted box-like housing of the microwave energy applicator.

13. The self-propelled farm machine having an apparatus for rapidly treating a soil's surface and subsurface by irradiation with microwave energy according to claim 12, further includes a trapping means formed from electrically conductive material attached to the bottom edges and located between the bottom edges and the surface of the soil terminating prior to the surface of the soil, wherein there is a gap between the surface of the soil and the trapping means, wherein the electrically conductive material suppresses broadcasting of the microwave energy through the gap.

14. The self-propelled farm machine having an apparatus for rapidly treating a soil's surface and subsurface by irradiation with microwave energy according to claim 12, further includes chain traps that are flexible metallic chains made from conductive material extending around the trapping means, wherein the chain traps extend downwardly from the trapping means contacting and dragging along the surface of the soil and the chain traps assist in blocking the outwardly propagation of microwave energy through the gap.

15. The self-propelled farm machine having an apparatus for rapidly treating a soil's surface and subsurface by irradiation with microwave energy according to claim 11, further includes:
   at least one waveguide operatively mounted in the microwave energy applicator, having slits spaced apart along an underside to provide for a distributed downward release of microwave energy into the surface and the subsurface of the soil;
   a horizontal panel operatively mounted within the microwave energy applicator to support the at least one waveguide; and
   at least one magnetron tube operatively connected to the at least one waveguide, wherein the waveguides are excited by the at least one magnetron tube.

16. The self-propelled farm machine having an apparatus for rapidly treating a soil's surface and subsurface by irradiation with microwave energy according to claim 15, further includes electrical connections located between the magnetron tubes in the microwave energy applicator and the microwave source power supply.

17. The self-propelled farm machine having an apparatus for rapidly treating a soil's surface and subsurface by irradiation with microwave energy according to claim 9, further including an hydraulically-operated coupling operatively mounted between and connecting the frame of the self-propelled farm machine and the microwave energy applicator, and wherein the hydraulically-operated coupling moves the microwave energy applicator vertically between the first and second positions.

18. The self-propelled farm machine having a portable apparatus for rapidly treating a soil's surface and subsurface by irradiation with microwave energy according to claim 17, wherein the hydraulically-operated coupling moves the microwave energy applicator upwardly in a non-operational state such that the self-propelled farm machine is able to move with the microwave energy applicator remote from the surface of the soil.

19. The self-propelled farm machine having a portable apparatus for rapidly treating a soil's surface and subsurface by irradiation with microwave energy according to claim 17, wherein the hydraulically-operated coupling moves the microwave energy applicator downwardly into an operational state such that the microwave energy applicator is proximate to the surface of the soil.

20. A method for rapidly treating a soil's surface and subsurface by irradiation with microwave energy, comprising:
   moving a microwave energy applicator from a second position to a first position;
   providing power to the microwave energy applicator;
   emitting microwaves to the surface and the subsurface of the soil when the microwave energy applicator is in the second position;
   moving the microwave energy applicator over the surface of the soil to be treated;
   using said microwaves to sterilize seeds and kill insects; and
   moving the microwave energy applicator from the first position to the second position when the energy applicator is not in use.

21. The method for rapidly treating a soil's surface and subsurface by irradiation with microwave energy according to claim 20, further includes:
   emitting microwaves to the surface and the subsurface of the soil to a depth of approximately two inches below the surface of the soil.

22. The method for rapidly treating a soil's surface and subsurface by irradiation with microwave energy according to claim 20, further includes:
   moving the location of the microwave energy about the surface of the soil.

* * * * *